(12) United States Patent
Wang et al.

(10) Patent No.: US 11,756,267 B2
(45) Date of Patent: *Sep. 12, 2023

(54) METHOD AND APPARATUS FOR GENERATING GUIDANCE AMONG VIEWPOINTS IN A SCENE

(71) Applicant: Realsee (Beijing) Technology Co., Ltd., Beijing (CN)

(72) Inventors: Yiding Wang, Beijing (CN); Chengjie Li, Beijing (CN); Jie Bai, Beijing (CN); Yi Zhu, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,693

(22) Filed: May 23, 2022

(65) Prior Publication Data
US 2022/0284680 A1     Sep. 8, 2022

Related U.S. Application Data

(63) Continuation of application No. 17/406,838, filed on Aug. 19, 2021, now Pat. No. 11,461,975.

(30) Foreign Application Priority Data

Dec. 3, 2020   (CN) ......................... 202011398101.0
Jan. 22, 2021  (CN) ......................... 202110092880.X

(51) Int. Cl.
*H04N 13/117*     (2018.01)
*H04N 13/183*     (2018.01)
*G06T 19/00*      (2011.01)

(52) U.S. Cl.
CPC ......... *G06T 19/003* (2013.01); *H04N 13/117* (2018.05); *H04N 13/183* (2018.05)

(58) Field of Classification Search
CPC .. G06T 19/003; H04N 13/117; H04N 13/183; G06F 3/011
See application file for complete search history.

(56) References Cited

U.S. PATENT DOCUMENTS 6,828,962 B1 * 12/2004 McConkie ............. G06T 19/20
                                                   345/419
2003/0184567 A1 * 10/2003 Fujiki ...................... G06T 3/40
                                                   345/660

(Continued)

FOREIGN PATENT DOCUMENTS

CN      111599021 A      8/2020
CN      111669561 A      9/2020

OTHER PUBLICATIONS

Chinese Patent Office, First Office Action in Chinese Patent Application No. 202011398101.0 (dated Sep. 14, 2021).

(Continued)

*Primary Examiner* — Jitesh Patel
(74) *Attorney, Agent, or Firm* — Leydig, Voit & Mayer, Ltd.

(57) ABSTRACT

A method for navigating in a simulated environment is disclosed herein. A navigation device determines a search space associated with a plurality of viewpoints other than the current viewpoint in a three-dimensional (3D) space for a current viewpoint. The search space comprises a set of 3D coordinates for each of the plurality of viewpoints. The navigation device determines a field of view at the current viewpoint, which is an area associated with a viewing angle and a visible distance. The navigation device determines a target viewpoint in the search space of the current viewpoint based on the field of view at the current viewpoint. The target viewpoint is outside the area of the field of view at the current viewpoint. The navigation device causes display of (Continued)

a guidance user interface (UI) comprising an indicator corresponding to the target viewpoint in the field of view at the current viewpoint.

17 Claims, 11 Drawing Sheets

(56) References Cited

U.S. PATENT DOCUMENTS

| | | | | |
|---|---|---|---|---|
| 2008/0238916 A1* | 10/2008 | Ghosh | ............... | G06T 19/00 |
| | | | | 345/419 |
| 2010/0302239 A1* | 12/2010 | Tokita | ............... | A63F 13/06 |
| | | | | 345/419 |
| 2015/0269785 A1* | 9/2015 | Bell | ............... | G06T 19/003 |
| | | | | 345/427 |
| 2021/0012530 A1* | 1/2021 | Zheng | ............... | G06T 7/60 |

OTHER PUBLICATIONS

Chinese Patent Office, Second Office Action in Chinese Patent Application No. 202011398101.0 (dated Dec. 21, 2021).
Chinese Patent Office, First Office Action in Chinese Patent Application No. 202110092880.X (dated Oct. 21, 2021).
U.S. Appl. No 17/406,838, filed Aug. 19, 2021.

* cited by examiner

METHOD AND APPARATUS FOR GENERATING GUIDANCE AMONG VIEWPOINTS IN A SCENE

CROSS REFERENCE TO RELATED APPLICATIONS

This application is a continuation of U.S. application Ser. No. 17/406,838, filed Aug. 19, 2021. This application claims the benefits of priorities to Chinese Patent Application No. 202011398101.0, filed Dec. 3, 2020, and Chinese Patent Application No. 202110092880.X, filed Jan. 22, 2021, the entire contents of which are incorporated herein by reference.

TECHNICAL FIELD

The present disclosure relates to the field of computer vision and, more specifically, to the virtual reality technology.

BACKGROUND

Virtual reality (VR) is a computer-generated environment including simulated scenes and objects, such that a user can have an immersed experience of the surrounding scenes and objects. The computer-generated environment may be generated based on spatial information collected by a data acquisition device, such as a mobile phone integrated with one or more cameras. For instance, a user may acquire a plurality of images for a 3D space. The user may acquire the plurality of images at multiple locations in the 3D space, and the user may rotate by 360 degrees to obtain a panoramic view at each location. As such, the images acquired by the mobile phone may be used to generate the computer-generated environment of the 3D space. The 3D space may be an indoor or outdoor space.

When a user is roaming through the computer-generated environment, the user can observe their surroundings at a viewpoint in the environment and switch to view a different viewpoint in the environment. The viewpoints in the environment that the user can select are usually associated with the positions at which the data acquisition device collects the spatial information for generating the environment. There are situations when certain viewpoints are not accessible to the user, thus affecting the user experience of roaming in the computer-generated environment.

For instance, due to the limited resolution and/or data capacity of the data acquisition device, the generated environment may include incomplete scenes, such as geographically disconnected areas. Therefore, the user cannot reach certain viewpoints by moving in the environment.

For another instance, the computer-generated environment may be an outdoor and/or open space, which may include viewpoints that are distant from each other. Therefore, the user may feel it difficult to find another viewpoint by moving from the current viewpoint.

Thus, there is a need for providing robust navigation solutions to assist a user while roaming in a VR environment, thus ensuring a seamless user experience in the VR environment.

SUMMARY

A method, computer readable medium and apparatus are disclosed for navigating in a simulated environment. A guidance user interface (UI) may be displayed in the field of view at a current viewpoint to point in a particular direction towards a target viewpoint in the scene, thus ensuring a seamless user experience in navigating in a simulated environment. As such, a user experience of roaming in a VR environment may be improved.

In some embodiments, a method is provided for navigating in a simulated environment. The method comprises determining a search space associated with a plurality of viewpoints other than the current viewpoint in a 3D space for a current viewpoint, determining a field of view at the current viewpoint, determining a target viewpoint in the search space of the current viewpoint based on the field of view at the current viewpoint and causing display of a guidance user interface (UI) comprising an indicator corresponding to the target viewpoint in the field of view at the current viewpoint. The search space comprises a set of 3D coordinates for each of the plurality of viewpoints. The set of 3D coordinates indicates a position of the corresponding viewpoint in the 3D space. The field of view is associated with a viewing angle and a visible distance.

In some embodiments, the set of 3D coordinates is associated with a 3D coordinate system. Determining the search space further comprises projecting the set of 3D coordinates onto a two-dimensional (2D) coordinate system to generate a set of 2D coordinates for each of the plurality of viewpoints. Determining the target viewpoint in the search space is based on the set of 2D coordinates associated with the target viewpoint of the plurality of viewpoints.

In some embodiments, determining the search space further comprises determining a plurality of first distances associated with the set of 2D coordinates for the plurality of viewpoints and a set of 2D coordinates for the current viewpoint, and determining a plurality of angles associated with the set of 2D coordinates for the plurality of viewpoints and the set of 2D coordinates for the current viewpoint. Determining the target viewpoint in the search space is based on a target distance, of the plurality of first distances, associated with the target viewpoint and a target angle, of the plurality of angles, associated with the target viewpoint.

In some embodiments, determining the target viewpoint in the search space further comprises determining a single viewpoint of the plurality of viewpoints in the search space, and determining the single viewpoint as the target viewpoint. The single viewpoint is associated with an angle, of the plurality of angles, smaller than the viewing angle at the current viewpoint. Causing display of the guidance UI comprises generating the guidance UI based on the target angle associated with the target viewpoint and the viewing angle at the current viewpoint.

In some embodiments, determining the target viewpoint in the search space further comprises determining at least two viewpoints of the plurality of viewpoints in the search space, and determining a viewpoint of the at least two viewpoints as the target viewpoint based on the viewpoint having a shortest first distance. Each of the determined viewpoints is associated with an angle, of the plurality of angles, smaller than the viewing angle at the current viewpoint and a first distance, of the plurality of first distances, greater than the visible distance at the current viewpoint. Causing display of the guidance UI comprises generating the guidance UI based on the target angle associated with the target viewpoint and the viewing angle at the current viewpoint.

In some embodiments, determining the search space further comprises determining a plurality of second distances associated with the set of 2D coordinates for the plurality of viewpoints and a center line of the field of view at the current viewpoint and determining a plurality of angles associated with the set of 2D coordinates for the plurality of viewpoints and the set of 2D coordinates for the current viewpoint. Determining the target viewpoint in the search space is based on a target distance, of the plurality of second distances, associated with the target viewpoint and a target angle, of the plurality of angles, associated with the target viewpoint.

In some embodiments, the target viewpoint has the shortest second distance of the plurality of second distances in the search space.

In some embodiments, the method further comprises determining a mid-point between the target viewpoint and the current viewpoint and a line between the viewpoint and the current viewpoint, determining a perpendicular line associated with the mid-point and the line between the target viewpoint and the current viewpoint, determining a shape of the indicator based on an arc defined by an intersection between the perpendicular line and a coordinate axis associated with the current viewpoint, and generating the guidance UI based on the shape of the indicator.

In some embodiments, the viewing angle at the current viewpoint is partitioned into a number of portions. The method further comprises determining a portion of the viewing angle that the target viewpoint falls in based on a target angle associated with the target viewpoint, determining a shape of the indicator corresponding to the portion of the viewing angle that the target viewpoint falls in, and generating the guidance UI based on the shape of the indicator.

In some embodiments, the shape of the indicator comprises one or more arrows pointing in a particular direction.

In some embodiments, the method further comprises determining an observing height for the current viewpoint based on a set of 3D coordinates associated with the current viewpoint, determining a scaling ratio based on the observing height at the current viewpoint and a standard observing height for the guidance UI, and scaling a shape of the indicator comprised in the guidance UI from a standard shape of the indicator associated with the standard observing height based on the scaling ratio. The standard observing height associated with the standard shape of an indicator.

In some embodiments, causing the display of the guidance UI is dynamically updated, in response to the field of view at the current viewpoint changes.

In some embodiments, a device is provided for navigating in a simulated environment. The device comprises one or more processors and a non-transitory computer-readable medium having computer-executable instructions stored thereon. The computer-executable instructions, when executed by one or more processors, cause the one or more processors to facilitate determining a search space associated with a plurality of viewpoints other than the current viewpoint in a 3D space for a current viewpoint, determining a field of view at the current viewpoint, a target viewpoint in the search space of the current viewpoint based on the field of view of at the current viewpoint and causing display of a guidance user interface (UI) comprising an indicator corresponding to the target viewpoint in the field of view at the current viewpoint. The search space comprises a set of 3D coordinates for each of the plurality of viewpoints. The set of 3D coordinates indicates a position of the corresponding viewpoint in the 3D space. The field of view is associated with a viewing angle and a visible distance.

In some embodiments, the set of 3D coordinates is associated with a 3D coordinate system. Determining the search space further comprises projecting the set of 3D coordinates onto a 2D coordinate system to generate a set of 2D coordinates for each of the plurality of viewpoints. Determining the target viewpoint in the search space is based on the set of 2D coordinates associated with the target viewpoint of the plurality of viewpoints.

In some embodiments, determining the search space further comprises determining a plurality of first distances associated with the set of 2D coordinates for the plurality of viewpoints and a set of 2D coordinates for the current viewpoint, and determining a plurality of angles associated with the set of 2D coordinates for the plurality of viewpoints and the set of 2D coordinates for the current viewpoint. Determining the target viewpoint in the search space is based on a target distance, of the plurality of first distances, associated with the target viewpoint and a target angle, of the plurality of angles, associated with the target viewpoint.

In some embodiments, determining the search space further comprises determining a single viewpoint of the plurality of viewpoints in the search space, and determining the single viewpoint as the target viewpoint. The single viewpoint is associated with an angle, of the plurality of angles, smaller than the viewing angle at the current viewpoint. Causing display of the guidance UI comprises generating the guidance UI based on the target angle associated with the target viewpoint and the viewing angle at the current viewpoint.

In some embodiments, determining the search space further comprises determining at least two viewpoints of the plurality of viewpoints in the search space, and determining a viewpoint of the at least two viewpoints as the target viewpoint based on the viewpoint having a shortest first distance. Each of the determined viewpoints is associated with an angle, of the plurality of angles, smaller than the viewing angle at the current viewpoint and a first distance, of the plurality of first distances, greater than the visible distance at the current viewpoint. Causing display of the guidance UI comprises generating the guidance UI based on the target angle associated with the target viewpoint and the viewing angle at the current viewpoint.

In some embodiments, determining the search space further comprises determining a plurality of second distances associated with the set of 2D coordinates for the plurality of viewpoints and a center line of the field of view at the current viewpoint, and determining a plurality of angles associated with the set of 2D coordinates for the plurality of viewpoints and the set of 2D coordinates for the current viewpoint. Determining the target viewpoint in the search space is based on a target distance, of the plurality of second distances, associated with the target viewpoint and a target angle, of the plurality of angles, associated with the target viewpoint.

In some embodiments, the target viewpoint has the shortest second distance of the plurality of second distances within the search space.

In some embodiments, a non-transitory computer-readable medium is provided. The non-transitory computer-readable medium has computer-executable instructions stored thereon, which, when executed by one or more processor, cause a processor to facilitate determining a search space associated with a plurality of viewpoints other than the current viewpoint in a 3D space for a current viewpoint, determining a field of view at the current viewpoint, a target viewpoint in the search space of the current viewpoint based on the field of view of at the current viewpoint and causing display of a guidance user interface (UI) comprising an indicator corresponding to the target viewpoint in the field of view at the current viewpoint. The search space comprises a set of 3D coordinates for each of the plurality of viewpoints. The set of 3D coordinates indicates a position of the corresponding viewpoint in the 3D space. The field of view is associated with a viewing angle and a visible distance.

BRIEF DESCRIPTION OF THE DRAWINGS

The subject technology will be described in even greater detail below based on the exemplary figures, but is not limited to the samples. All features described and/or illustrated herein can be used alone or combined in different combinations. The features and advantages of various examples will become apparent by reading the following detailed description with reference to the attached drawings which illustrate the following.

DETAILED DESCRIPTION

The present disclosure described herein provides solutions for navigating in a simulated environment. When a user is at a current viewpoint in a 3D environment, a navigation device may determine a search space associated with a plurality of viewpoints other than the current viewpoint in the 3D environment. Moreover, the navigation device may determine positional relationships between the current viewpoint and the viewpoint in the search space based on the 3D coordinates associated with the viewpoints in the search space and the field of view of the user at the current viewpoint. In some examples, the navigation device may determine a target viewpoint when none of the viewpoints falls in the field of view of the user at the current viewpoint. In some instances, the navigation device may determine a guidance UI associated with the target viewpoint and cause display of the guidance UI in the field of view of the user. In some variations, the guidance UI may include an indicator corresponding to the target viewpoint. The user may select the indicator included in the guidance UI to switch view to the target viewpoint.

In some examples, the navigation device may dynamically determine the positional relationships between the current viewpoint and the viewpoint in the search space when the user rotates at the current viewpoint. As such, the navigation device may cause dynamic display of the guidance UI in accordance with a real-time determination of a target viewpoint performed by the navigation device.

By applying the solutions provided herein, a seamless user experience in navigating in a simulated environment is realized, thus providing improved user experience for VR applications.

Figure 1:
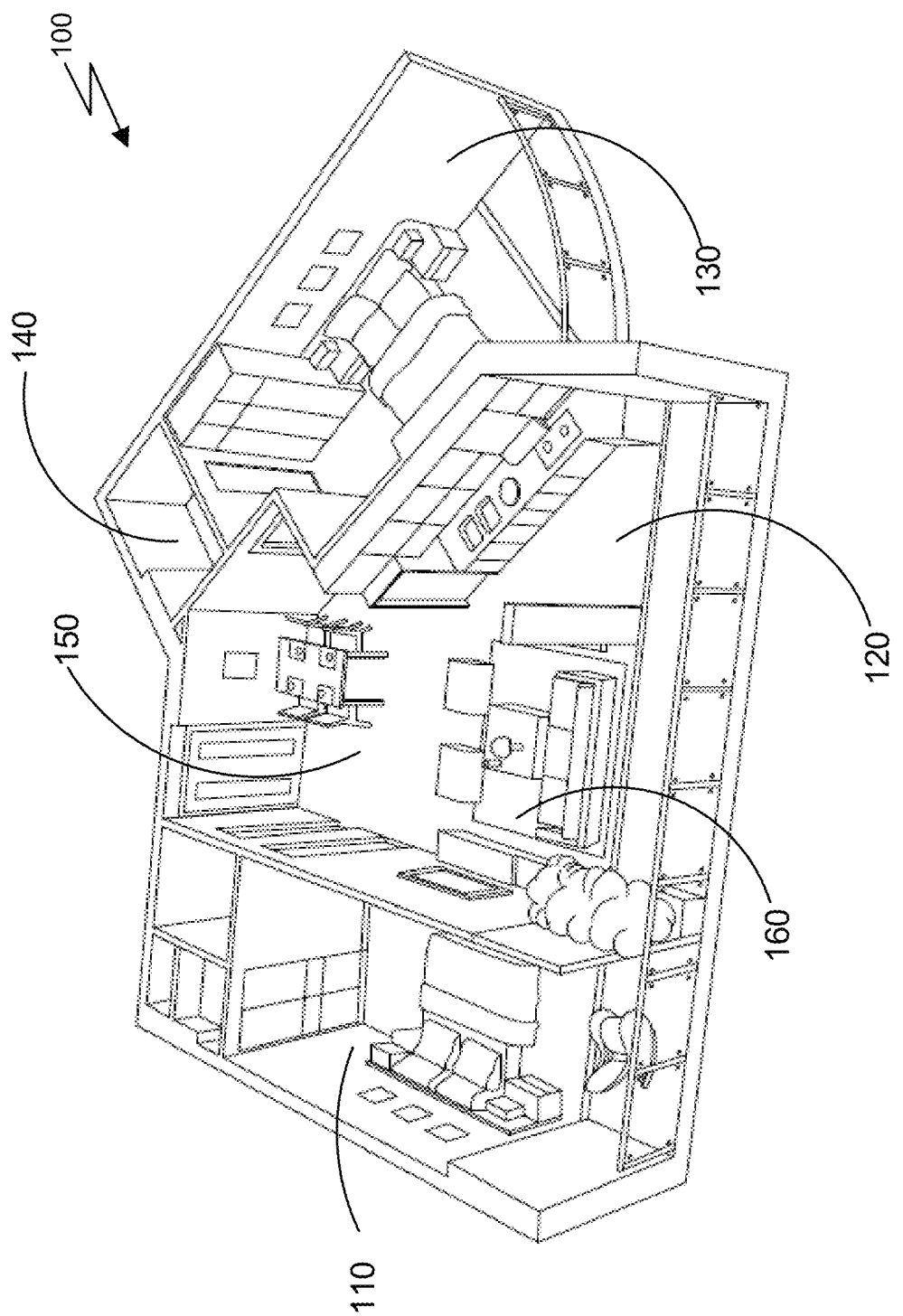
FIG. 1 illustrates an exemplary 3D virtual reality (VR) environment in accordance with one or more embodiments.

FIG. 1 illustrates an exemplary 3D VR environment 100, in accordance with some embodiments. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some instances, a functional space may correspond to an enclosed or partially enclosed space within or adjacent to a room. For example, functional space 140 may correspond to a closet. In other instances, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
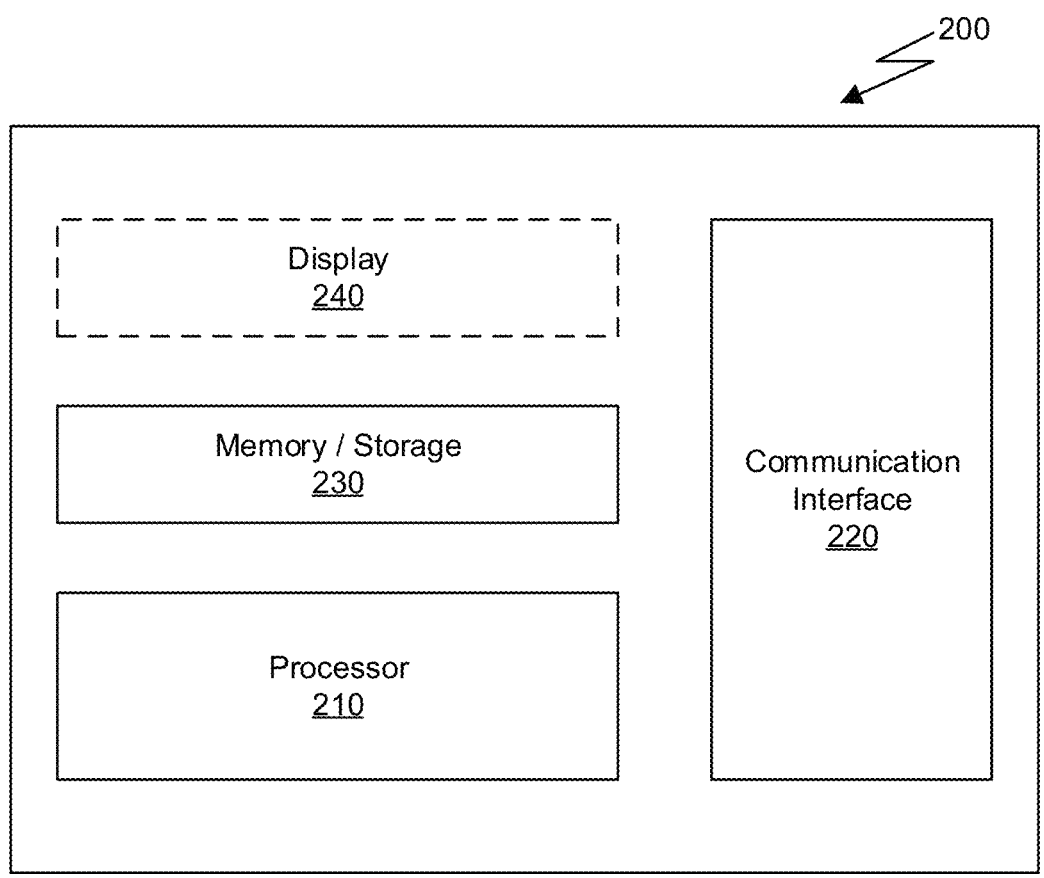
FIG. 2 illustrates a block diagram of an exemplary computer system in accordance with one or more embodiments.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a read-only memory (ROM), a flash memory, a dynamic random-access memory (RAM), and/or a static RAM.

Processor 210 may be configured to perform the operations in accordance with the instructions stored in memory 230. Processor 210 may include any appropriate type of general-purpose or special-purpose microprocessor, digital signal processor, microcontroller, or the like. In some examples, processor 210 may be configured as a separate processor module dedicated to performing one or more specific operations disclosed herein. In other examples, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to terminal a device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
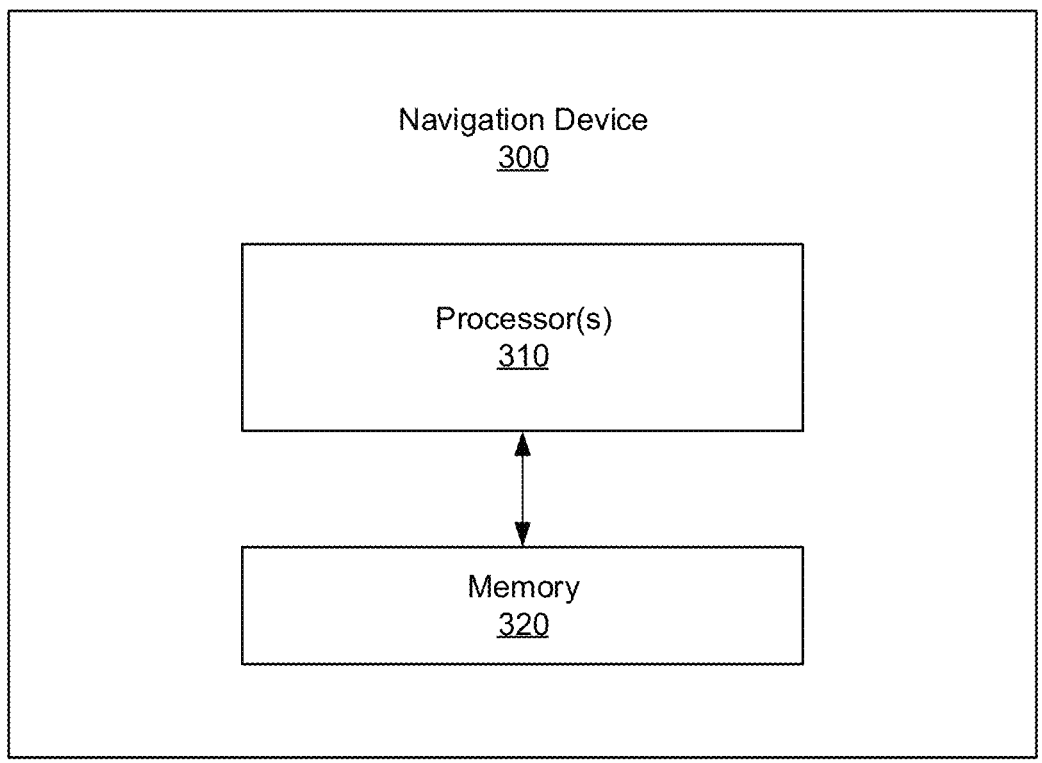
FIG. 3 illustrates a block diagram of a navigation device in accordance with one or more embodiments.

FIG. 3 is a block diagram of a navigation device 300 in accordance with one or more embodiments. Navigation device 300 may include one or more processors 310 and/or a memory 320. In some examples, processor 310 may be a central processing unit (CPU), controller, and/or logic, that executes computer executable instructions for performing the functions, processes, and/or methods described herein. In some examples, the computer executable instructions are locally stored and accessed from a non-transitory computer readable medium, such as memory 210, which may be a hard drive or flash drive. In some examples, navigation device 300 may be an example of device 200 shown in FIG. 2. As such, the navigation device 300 may further include a communication interface (not shown) and/or may optionally include a display. In some examples, navigation device 300 may further include an interface to receive data from and/or transmit data to device 200 for data processing and/or to enable a remote VR experience by a user.

Figure 4:
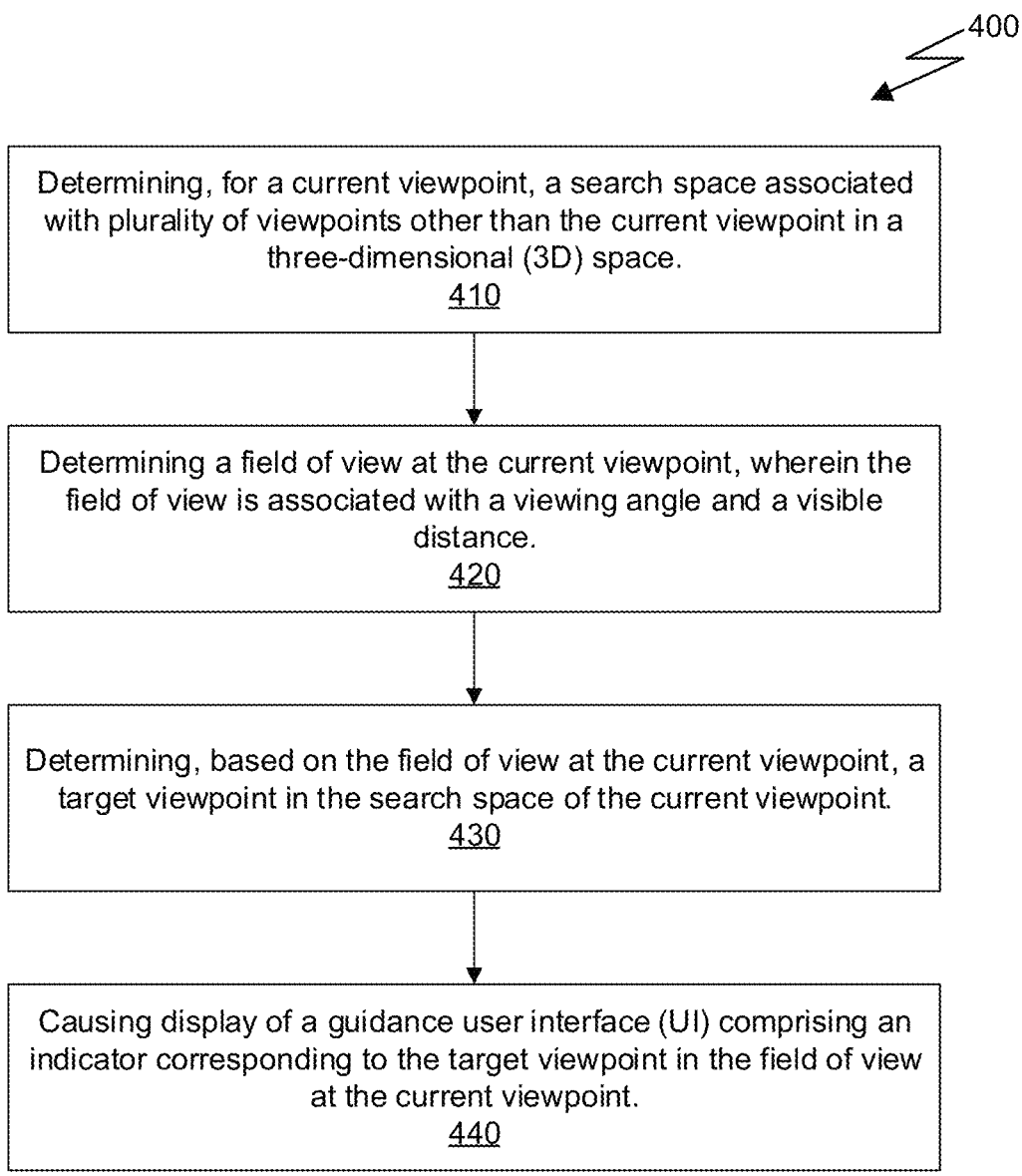
FIG. 4 illustrates a process for navigating in a simulated environment in accordance with one or more embodiments.

FIG. 4 is an exemplary process 400 for navigating in a simulated environment in accordance with one or more embodiments. Process 400 may be performed by navigation device 300 shown in FIG. 3. However, it will be recognized that process 400 may be performed in any suitable environment and that any of the following blocks may be performed in any suitable order.

In some examples, the simulated environment may be generated based on spatial information (e.g., color and/or depth images) collected by using a data acquisition device, where the data acquisition device may be placed at multiple locations in a 3D space to collect the spatial information. For instance, a user may use a mobile phone at multiple positions in the 3D space to collect color and/or depth images of the 3D space. Such spatial information collected by the mobile phone may be used to reconstruct the 3D space, so as to generate the simulated environment. In some examples, the plurality of viewpoints in the simulated environment may be associated with positions at which the mobile phone collects the spatial information. For instance, the plurality of viewpoints in the simulated environment may be determined based on the coordinates associated with the mobile phone during the data acquisition process.

Figure 5:
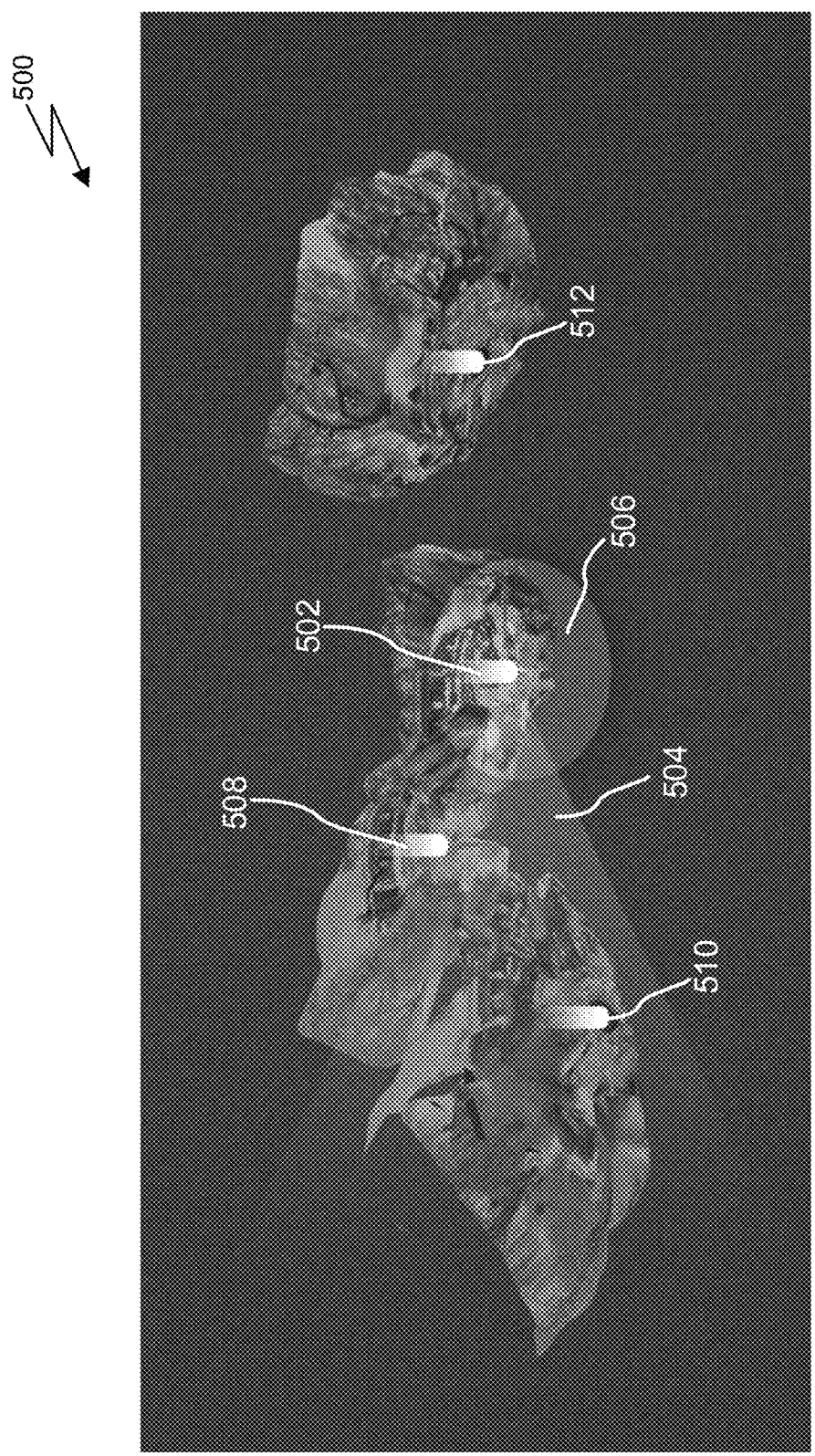
FIG. 5 illustrates an exemplary scenario of navigating in a simulated environment in accordance with one or more embodiments.
Figure 6A:
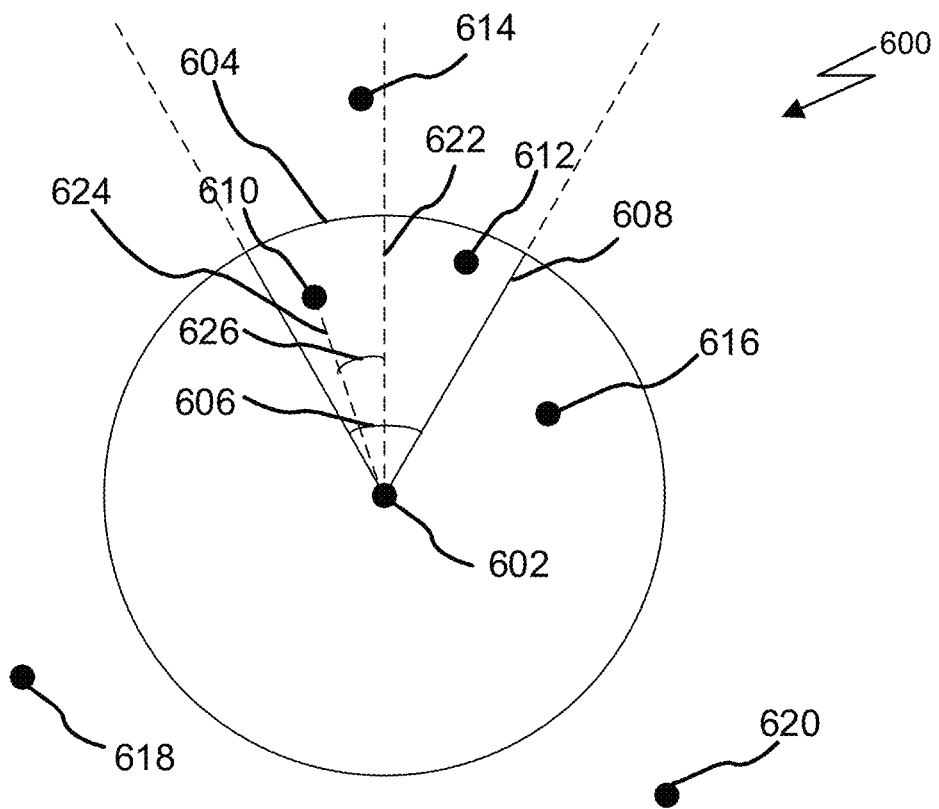
FIG. 6A illustrates a plurality of viewpoints in a search space of a current viewpoint on a 2D coordinate plane in accordance with one or more embodiments.

At block 410, navigation device 300 determines a search space for a current viewpoint. A search space is set of viewpoints that are related to the current viewpoint. The search space may be associated with a plurality of viewpoints other than the current viewpoint in a simulated environment. FIGS. 5 and 6A will be used to describe this in more detail.

FIG. 5 illustrates an exemplary simulated environment 500 in accordance with one or more embodiments. Simulated environment 500 includes a plurality of viewpoints such as viewpoints 502, 508, 510 and 512. A user may be placed at a current viewpoint, which is one of the plurality of viewpoints, to observe the surroundings in simulated environment 500. The surroundings at the current viewpoint may include simulated scenes and/or objects. For instance, the simulated scenes may include a panoramic scene at the current viewpoint. For instance, viewpoint 502 may be the current viewpoint in FIG. 5. The user may rotate at current viewpoint 502 to observe a panoramic scene that is contained in simulated environment 500. Navigation device 300 may determine a search space for current viewpoint 502, so as to determine a guidance to assist with the user's navigation experience in simulated environment 500. The search space for current viewpoint 502 may be associated with viewpoints 508, 510 and 512 in simulated environment 500. Each of the plurality of viewpoints in simulated environment 500 may be associated with a set of 3D coordinates. Based on the 3D coordinates associated with the plurality of viewpoints in simulated environment 500, navigation device 300 may determine a plurality of positions of the corresponding viewpoints in simulated environment 500. Moreover, navigation device 300 may determine a relative position of each of the viewpoints associated with the search space with respect to the current viewpoint. The relative position of the viewpoint may be related to a plurality of parameters that may include a distance, an angle, and/or a direction of the viewpoint with respect to the current viewpoint. The distance may indicate a distance between the corresponding viewpoint and the current viewpoint in a 3D space. The angle may indicate a 3D angle of a line connecting the corresponding viewpoint and the current viewpoint with respect to the direction of the user. In some examples, the direction of the user may be represented as a center line of the field of view of the user. The direction may indicate a qualitative positional relationship (e.g., left, forward, or right) between the corresponding viewpoint and the direction of the user. The parameters related to the relative position of the viewpoints may vary when the user rotates at the current viewpoint. As such, navigation device 300 may dynamically update the search space with regard to the relative positions of the corresponding viewpoints for the current viewpoint.

In some examples, navigation device 300 may determine a visible area at the current viewpoint. As shown in FIG. 5, navigation device may determine a visible area 506 at current viewpoint 502, such that the viewpoints that fall in visible area 506 may be visible to the user. In some examples, visible area 506 may be a circular area on the ground, which is centered at current viewpoint 502 with a radius of a visible distance. Moreover, a field of view of the user may be associated with a viewing angle, the visible distance that is the radius of the visible area, and a direction of the user. The viewing angle may include one or more angles that indicating a horizontal, vertical, and/or diagonal range of visual field of the user. The shape of the field of view may be a 3D geometric shape such as a cone. For instance, the shape of the cone may be associated with the viewing angle and the visible distance, and the apex of the cone is at the current viewpoint. The field of view of the user rotates when the direction of the user rotates. Additionally, and/or alternatively, navigation device may determine a sector area 504 that associated with the viewing angle. The field of view of the user may be an intersection of sector area 504 and visible area 506. When one or more viewpoints fall in the field of view of the user, the user may select one of the viewpoints to switch view. Sector area 504 may include an area that extends beyond visible area 506. Navigation device 300 may determine a target viewpoint that is in sector area 504 but outside the field of view of the user so as to generate a navigation guidance corresponding to the target viewpoint. As shown in FIG. 5, viewpoints 508 and 510 are in sector area 504 and outside the field of view of the user at current viewpoint 502. Navigation device 300 may determine either viewpoint 508 or 510 as the target viewpoint according to one or more selection rules, and thereafter cause display of a guidance UI corresponding to the target viewpoint.

In some examples, the 3D coordinates associated with the viewpoints in the simulated environment may be associated with a 3D coordinate system. For instance, each viewpoint in simulated environment 500 associates with a set of coordinates that indicates latitude, longitude and altitude of the ground position at the viewpoint. The set of coordinates associated with each viewpoint may further include height information that indicates a vertical distance of an observer, such as a user and/or a data acquisition device, to the ground. For instance, the height information associated with the viewpoint may be related to a height, at which a data acquisition device is placed for collecting the spatial information of a 3D space. Navigation device 300 may utilize the height information to adjust the appearance of the guidance UI, such that the appearance of the guidance UI may be consistent with the shape of the surrounding scenes and/or objects at different viewpoints, thus ensuring a seamless user experience while switch views.

In some examples, navigation device 300 may project the 3D coordinates associated with the plurality of viewpoints in the simulated environment onto a 2D coordinate system to generate a set of 2D coordinates for each of the plurality of viewpoints, so as to simplify the computation for the position of the corresponding viewpoint, thus reducing the computational complexity and improving the computing speed of determining the search space. Moreover, navigation device 300 may project the viewing angle onto a 2D plane, such that the viewing angle may be a horizontal angle that indicates a horizontal range of a visual field. Additionally, and/or alternatively, navigation device 300 may project a cone-shaped field of view of the user to be a sector area on a 2D plane. On the 2D plane, a direction of the user may be represented as a center line that divides the projected viewing angle associated with the field of view evenly by half.

FIG. 6A illustrates a plurality of viewpoints projected onto a 2D plane 600. Viewpoint 602 may be the current viewpoint. The visible area is a circular area centered at current viewpoint 602 with a radius of a visible distance 608. The viewpoints within the visible area, such as viewpoints 610, 612, 616, may be observed by the user. The viewpoints outside the visible area, such as viewpoints 614, 618 and 620, may not be observed by the user unless navigation device 300 causes display of a guidance UI associated with one of the viewpoints. In some examples, navigation device 300 may determine a field of view 604 of the user at current viewpoint 602 associates with a viewing angle 606 and visible distance 608. For instance, field of view 604 may be a sector area whose central angle is viewing angle 606 and radius is visible distance 608. The direction of field of view 604 at current viewpoint 602 may vary when the user rotates at current viewpoint 602. In some examples, the direction of field of view 604 may be indicated by a center line 622, which divides viewing angle 606 evenly by half.

Navigation device may determine a search space that is associated with a plurality of viewpoints other than the current viewpoint in a simulated environment. As such, the search space associated with current viewpoint 602 may be associated with viewpoints 610, 612, 614, 616, 618 and 620 that are projected on 2D plane 600. Navigation device 300 may determine positional relationships associated the viewpoints in the search space based on the plurality of 2D coordinates associated with the viewpoints on 2D plane 600. In some examples, navigation device 300 may determine a plurality of parameters associated with the viewpoints in the search space to indicate the positional relationships. For instance, for viewpoint 610, navigation device 300 may determine a plurality of parameters including a distance (e.g., a line 624) between viewpoint 610 and current viewpoint 602 on 2D plane 600, an angle (e.g., an angle 626) between line 624 and center line 622, and a direction indicating a relative position of line 624 with respect to center line 622 (e.g., left, forward and right). In some examples, navigation device 300 may determine another distance between each viewpoint in the search space and the center line of the field of view at the current viewpoint, so as to determine a viewpoint that is the most aligned with the direction of the user. In some examples, navigation device 300 may further determine a blocking status indicating whether a block exists between a viewpoint in the search space and current viewpoint 602. When the user rotates at current viewpoint 602, field of view 604 rotates accordingly with respect to current viewpoint 602. Navigation device 300 may dynamically update the plurality of parameters associated with the viewpoints in the search space when field of view 604 of the user rotates.

Figure 6B:
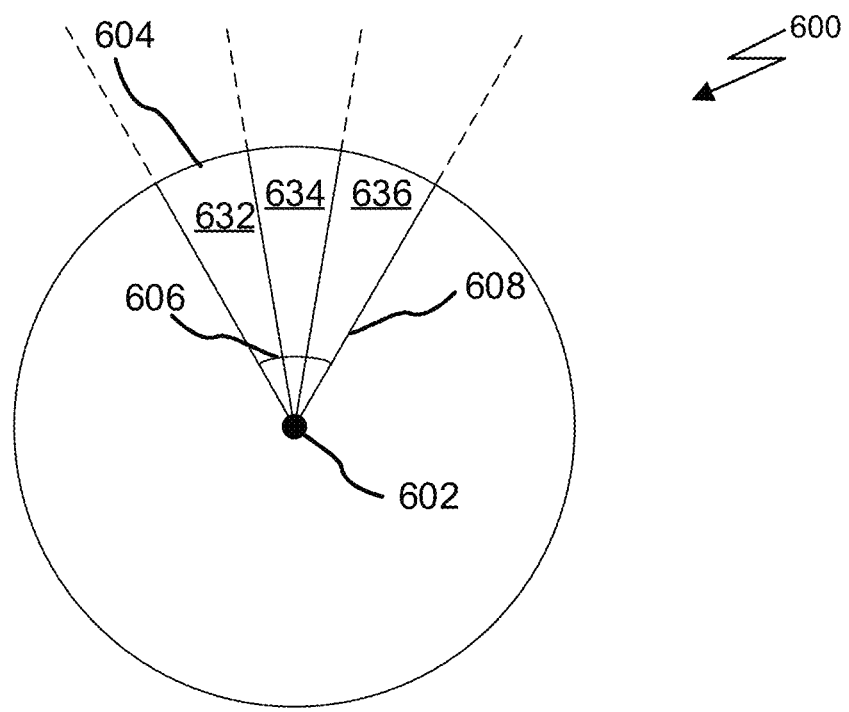
FIG. 6B illustrates portions of a viewing angle at a current viewpoint on a 2D coordinate plane in accordance with one or more embodiments.

In some examples, navigation device 300 may partition the viewing angle of the field of view to determine a particular direction (e.g., left, forward, or right) of a viewpoint in the search space. Navigation device 300 may partition the viewing angle evenly or unevenly into a plurality of portions. FIG. 6B illustrates portions of viewing angle 606 at a current viewpoint 602 on 2D plane 600 in accordance with one or more embodiments. By evenly partitioning viewing angle 606 of field of view 604, navigation device 300 may partition a sector area, which includes field of view 604 and an area extending beyond the field of view, evenly into three identical portions, which are portions 632, 634 and 636. In some examples, navigation device 300 may determine a left direction for a viewpoint that falls in portion 632, a forward direction for a viewpoint that falls in portion 634, and a right direction for a viewpoint that falls in portion 636. The way of performing the partition, the number of portions resulted from the partition process and/or the indication of a direction related to a portion should not be limited in this disclosure.

At block 420, navigation device 300 determines a field of view at the current viewpoint. The field of view is associated with a viewing angle and a visible distance. As described above, navigation device 300 may determine a field of view in a simulated environment, and/or a projected field of view on a 2D plane. Referring back to FIG. 5, navigation device 300 determines a field of view such as an intersection of sector area 504 and visible area 506 for a current viewpoint such as current viewpoint 502. In FIG. 6A, navigation device 300 determines a field of view such as field of view 604 for a current viewpoint such as current viewpoint 602. Additionally, and/or alternatively, navigation device 300 may determine a visible area associated with the visible distance in a 3D space, and/or onto a projected 2D plane. For instance, navigation device 300 determines a visible area such as visible area 506 for current viewpoint 502 as shown in FIG. 5. For another instance, navigation device 300 determines a visible area such as a circular area centered at current viewpoint 602 with a radius of a visible distance for current viewpoint 602 as shown in FIG. 6A. The field of view of the user may rotate when the user rotates at the current viewpoint. As such, navigation device 300 may dynamically update the search space when the field of view of the user rotates.

At block 430, navigation device 300 determines a target viewpoint (e.g., viewpoint 508 in FIG. 5) in the search space of the current viewpoint based on the field of view of the current viewpoint. In some examples, navigation device 300 may determine a target viewpoint based on one or more selection rules. In some examples, navigation device 300 may process the search space of the current viewpoint based on the determined field of view at block 420, so as to determine a viewpoint satisfying the one or more selection rules. The selection rules may be related to a shortest distance between the target viewpoint and the current viewpoint, a shortest distance between the target viewpoint and the center line of the field of view, and/or other user defined selection rules.

Figure 6C:
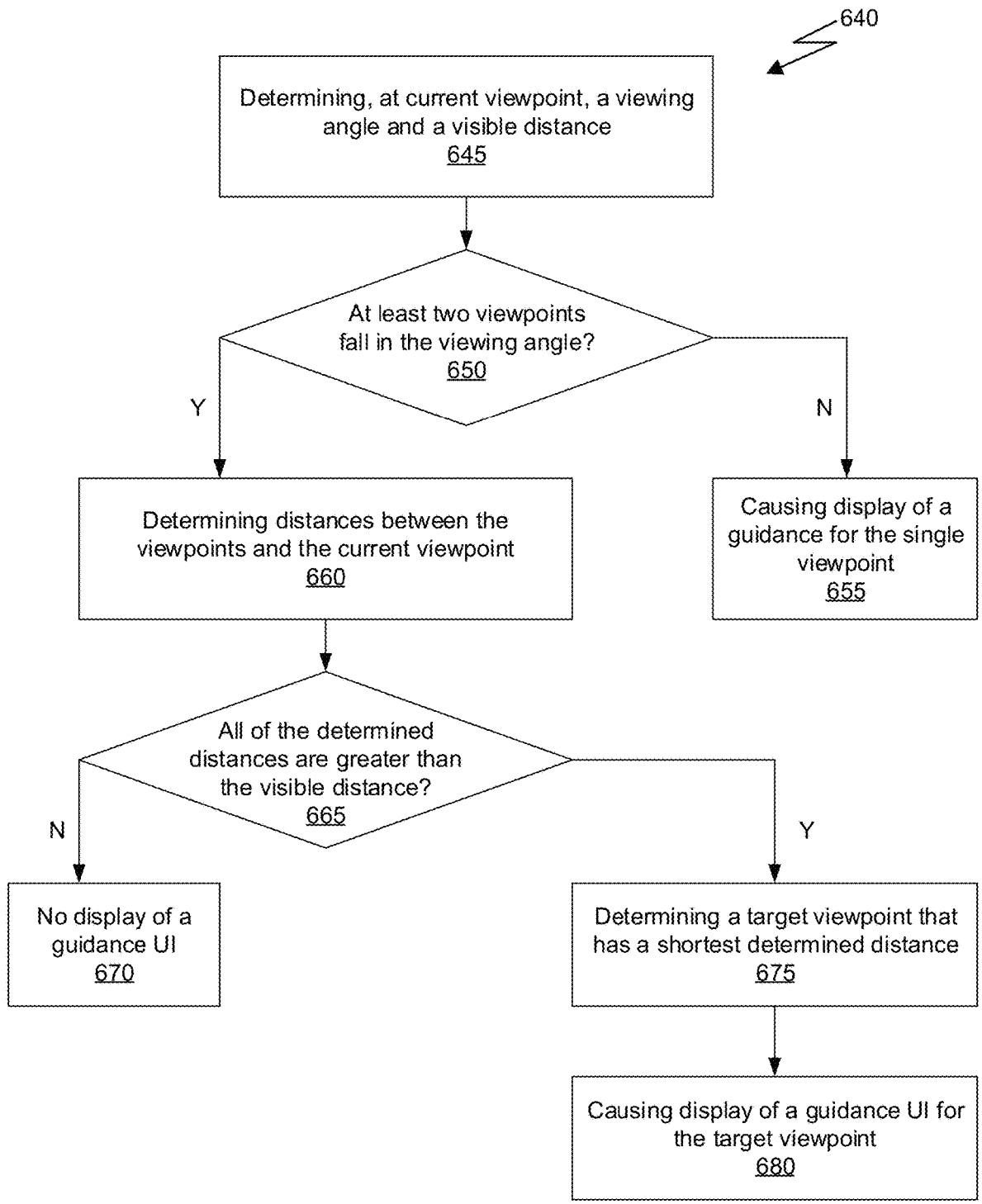
FIG. 6C is an exemplary flowchart of determining a target viewpoint in accordance with one or more embodiments.

FIG. 6C is a flowchart 640 that illustrates detailed steps of block 430 (e.g., determining a target viewpoint) in accordance with one or more embodiments.

At block 645, navigation device 300 determines a viewing angle and a visible distance at the current viewpoint. As described above, navigation device may determine a visible area, a field of view, a sector area that includes the field of view and an area extending beyond the field of view, and/or other parameters based on the viewing angle and the visible distance.

At block 650, navigation device 300 determines whether at least two viewpoints fall in the viewing angle, in other words, whether two or more viewpoints are in the sector area that includes the field of view and the area extended beyond the field of view. For instance, a sector area may be sector area 504 at current viewpoint 502 in simulated environment 500 as shown in FIG. 5.

At block 655, navigation device 300 causes display of a guidance for a single viewpoint in the viewing angle. Additionally, and/or alternatively, navigation device 300 may adopt a different selection rule in response to none of the viewpoints falling in the viewing angle. In some variations, navigation device 300 may determine not to display a guidance UI in response to none of the viewpoints falling in the viewing angle. Moreover, navigation device 300 may notify the user to change to a different direction in order to search for a viewpoint.

At block 660, navigation device 300 determines a plurality of distances of the viewpoints in the viewing angle to the current viewpoint. In some examples, navigation device 300 may obtain the plurality of distances from a plurality of parameters associated with the search space. In some variations, navigation device 300 may determine the plurality of distances and update, based on the determined distances, the plurality of parameters associated with the search space.

At block 665, navigation device 300 determines whether all of the determined distances are greater than the visible distance. Navigation device 300 may compare the determined distances from block 660, which are associated with the viewpoints in the viewing angle, to the visible distance. In some examples, navigation device 300 may perform the comparison on a projected 2D plane. For instance, in FIG. 6A, navigation device 300 may determine whether the viewpoints are in field of view 604 of the current viewpoint 602, or in a sector area extending beyond field of view 604.

At block 670, navigation device determines at least one distance smaller than or equal to the visible distance, in other words, at least one viewpoint is visible to the user. As such navigation device 300 may determine not to display a guidance UI. For instance, in FIG. 6A, viewpoints 610 and 612 are in field of view 604, therefore, navigation device 300 may determine not to display a guidance UI.

At block 675, navigation device determines a target viewpoint as a viewpoint having a shortest distance between the current viewpoint and the target viewpoint. For instance, in FIG. 5, viewpoint 508 may be determined as a target viewpoint for current viewpoint 502.

At block 680, navigation device 300 causes display of a guidance UI in the field of view of the user at the current viewpoint. In some examples, the guidance UI may include an indicator corresponding to the target viewpoint. For instance, the indicator may include a plurality of arrows pointing in a particular direction. Navigation device 300 may determine the direction of the indicator based on a direction of the target viewpoint with respect to the current viewpoint. In some examples, navigation device may obtain the direction of the target viewpoint from the search space that includes a plurality of parameters indicating relative positions of the viewpoints with respect to the current viewpoint. In some examples, navigation device 300 may divide the viewing angle of at the current viewpoint into a plurality of portions, and determine the direction of the target viewpoint by determining a portion of the viewing angle that the target viewpoint falls in.

Figures 7A, 7B, 7C:
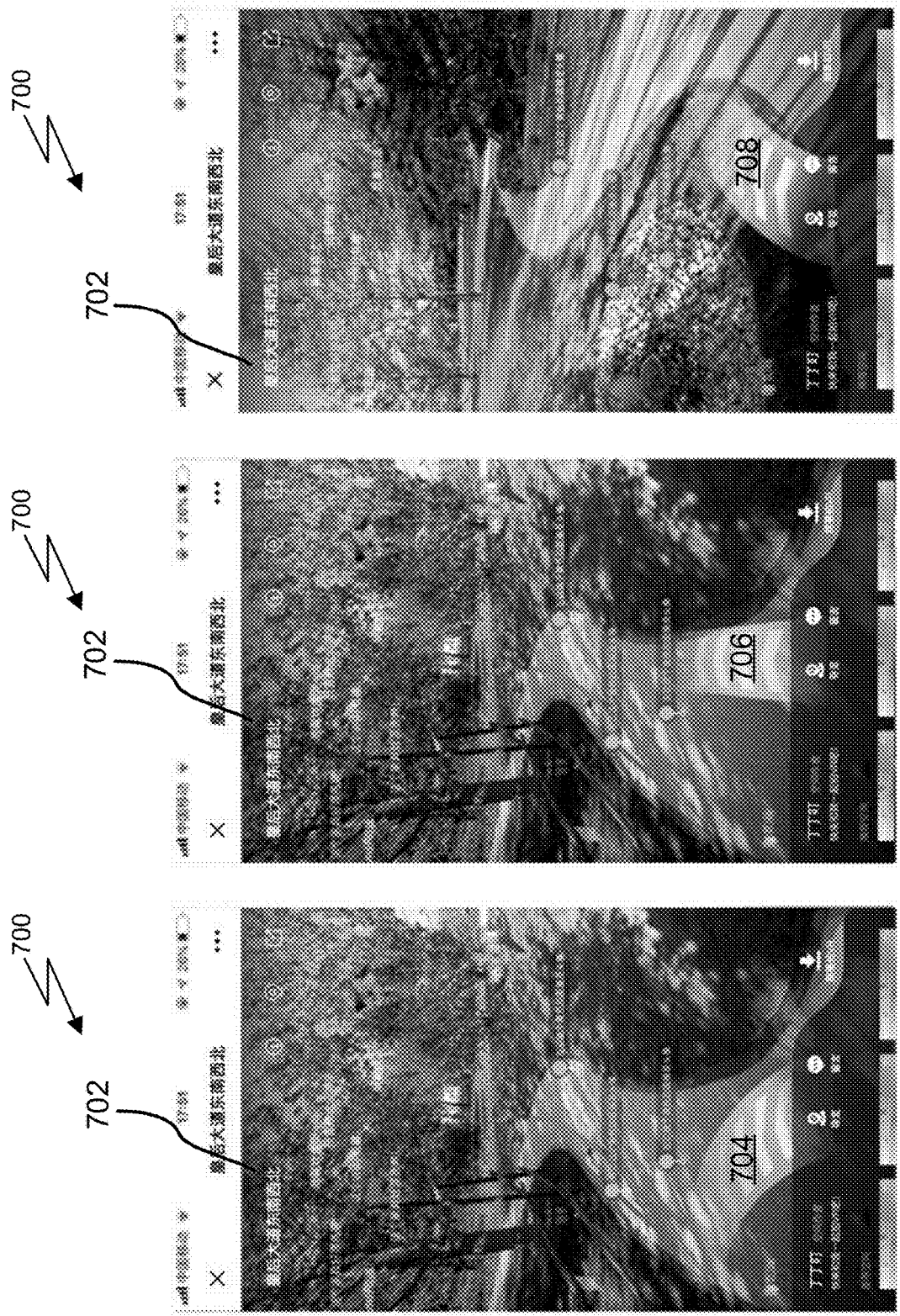
FIGS. 7A-C illustrate indicators pointing in different directions in accordance with one or more embodiments.

FIGS. 7A-C illustrate indicators pointing in different directions in accordance with one or more embodiments. In some examples, navigation device 300 may cause display of a guidance UI 702 on a display 700 of an electronic device, such as a mobile phone. Guidance UI 702 may include a portion of the simulated environment that is within the field of view of the user at the current viewpoint. In some examples, navigation device 300 may determine a target viewpoint that is beyond the field of view of the user at the current viewpoint, such that the target viewpoint may not be displayed on the guidance UI. Navigation device 300 may determine an indicator corresponding to the target viewpoint that is not visible on the guidance UI. In some examples, the indicator may include a plurality of arrows pointing in a particular direction. For instance, an indicator 704 as shown in FIG. 7A include a plurality of arrows pointing in a left direction. An indicator 706 as shown in FIG. 7B include a plurality of arrows pointing in a forward direction. An indicator 708 as shown in FIG. 7C include a plurality of arrows pointing in a right direction. In some examples, navigation device 300 may cause display of guidance UI 702 on display 700, where guidance UI 702 does not include an indicator corresponding to a target viewpoint. For instance, navigation device 300 may determine one or more viewpoints that fall in the field of view of the user. For another instance, navigation device 300 may determine that none of the viewpoints in the search space satisfy the selection rule(s) for determining a target viewpoint. In some examples, guidance UI 702 may further include an option to enable/disenable display of an indicator corresponding to a target viewpoint beyond the field of view of the user while the user can observe one or more viewpoints in the field of view.

Figure 8:
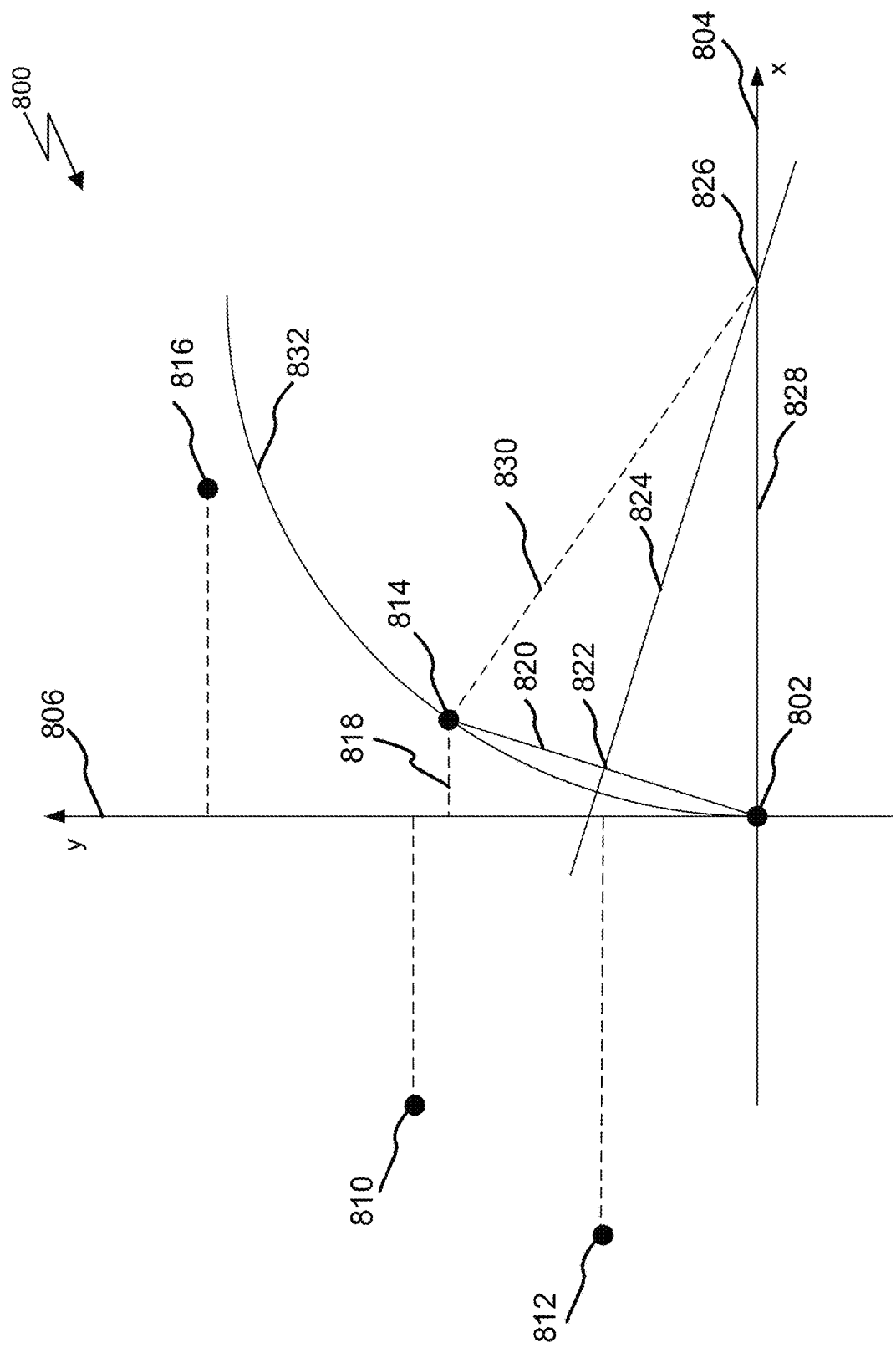
FIG. 8 illustrates detailed steps of determining a target viewpoint and a corresponding guidance UI in accordance with one or more embodiments.

FIG. 8 illustrates detailed steps of block 430 (e.g., determining a target viewpoint) and block 440 (e.g., causing display of a guidance UI) based on a selection rule in accordance with one or more embodiments. Navigation device 300 may project a plurality of viewpoints in a simulated environment onto a 2D plane 800. 2D plane 800 includes a 2D coordinate system having an x-axis 804 and a y-axis 806 that is orthogonal to x-axis. The projected viewpoints on 2D plane 800 include viewpoints 802, 810, 812, 814 and 816. Viewpoint 802 may be a current viewpoint. As such navigation device 300 may set current viewpoint 802 as the origin of 2D coordinate system. Moreover, navigation device 300 may set the direction of the user, such as the direction of the field of view of the user, as y-axis 806. In some examples, the direction of the user may be represented as a center line of the field of view of the user. In some examples, navigation device 300 may determine a search space for current viewpoint 802. The search space may be associated with viewpoints 810, 812, 814 and 816 that are on 2D plane 800. As described at block 410, each viewpoint in the search space may be associated with a set of 2D coordinates that are projected from a set of 3D coordinates. Navigation device 300 may determine a plurality of relative positions of the viewpoints in the search space based on the 2D coordinates associated with the corresponding viewpoints.

In some examples, navigation device 300 may determine a plurality of distances indicating distances between the viewpoints in the search space and y-axis 806. For instance, navigation device 300 may determine, for viewpoint 814, a distance 818 of viewpoint 814 to y-axis 806. Similarly, navigation device 300 may determine a distance of a viewpoint included in the search space to y-axis 806 for each of the viewpoints associated with the search space. Then navigation device 300 may determine a target viewpoint as a viewpoint having a shortest distance to y-axis 806. For instance, comparing with the other viewpoints in the search space, viewpoint 814 has the shortest distance to y-axis 806, such that navigation device 300 may determine viewpoint 814 as the target viewpoint. In some examples, navigation device 300 may further determine that a target viewpoint has to fall in the viewing angle of the user at the current viewpoint. In some examples, navigation device 300 may determine a target viewpoint based on one or more selection rules described herein. For instance, navigation device 300 may determine a target viewpoint by (1) determining at least two viewpoints having the shortest distance to the current viewpoint, and (2) determining a viewpoint having the shortest distance to the direction of the user. For another instance, navigation device 300 may determine a target viewpoint by (1) determining at least two viewpoints having the shortest distance to the direction of the user, and (2) determining a viewpoint having the shortest distance to the current viewpoint.

In some examples, navigation device 300 may determine a guidance UI corresponding to the target viewpoint based on the relative position of the target viewpoint with respect to the current viewpoint. Navigation device 300 may execute the following steps as illustrated in FIG. 8.

First, navigation device 300 may determine a line 820 between target viewpoint 814 and current viewpoint 802, and a mid-point 822 between target viewpoint 814 and current viewpoint 802.

Second, navigation device 300 may determine a perpendicular line 824 associated with mid-point 822 and line 820. For instance, line 824 may be perpendicular to line 820 and intersect with line 820 at mid-point 822.

Third, navigation device 300 may extend line 824 to intersect with x-axis 804, and determine, on x-axis, a point 826 that is the intersection of line 824 and x-axis 804. A distance of point 826 to current viewpoint 802, which is a line 828, is the same as a distance of point 826 to target viewpoint 814, which is a line 830. Navigation device 300 may determine an arc 832 as a portion of a circle that is centered at point 826 with a radius of the distance between intersection 826 and current viewpoint 802. As such, arc 830 passes through both current viewpoint 802 and target viewpoint 814, so as to indicate a quantitative direction from the current viewpoint to the target viewpoint.

In some examples, navigation device 300 may determine an indicator based on the determined arc. For instance, the shape of the indicator may be the determined arc. In some examples, the direction of the user may change when the user rotates at the current viewpoint, such that the positions of the viewpoints included in the search space may change with respect to y-axis 806. Navigation device 300 may dynamically determine a target viewpoint that satisfies the selection rule, and then the shape of an arc corresponding to the target viewpoint.

Figure 9:
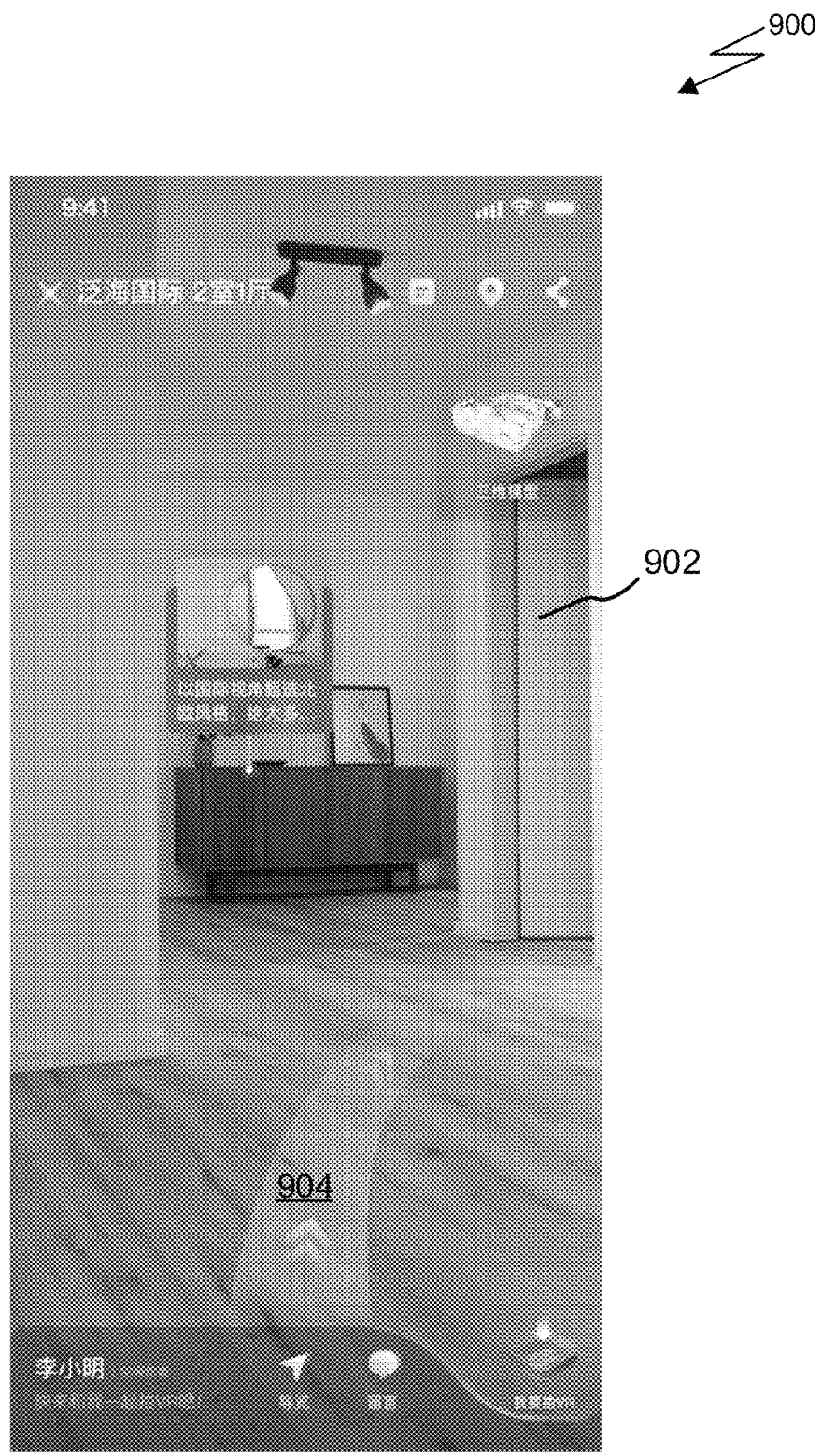
FIG. 9 illustrates display of an indicator in a guidance UI in accordance with one or more embodiments.

FIG. 9 illustrates display of an indicator in a guidance UI in accordance with one or more embodiments. In some examples, navigation device 300 may cause display of a guidance UI 902 on a display 900 of an electronic device, such as a mobile phone. Guidance UI 902 may include a portion of the simulated scene that is within the field of view of the user at the current viewpoint. In some examples, guidance UI 902 may include an indicator 904 corresponding to a target viewpoint. The target viewpoint may or may not be visible in the field of view of the user. In some examples, the shape of indicator 904 may be an arc (e.g., arc 832) that is determined following the steps illustrated in FIG. 8, such that the shape of the indicator indicates a quantitative direction from the current viewpoint to the target viewpoint. The current viewpoint may be indicated as a mid-point at the bottom of the guidance UI. In some examples, indicator 904 may include a plurality of arrows indicating a particular direction corresponding to the target viewpoint. The user may select the indicator to switch view to the target viewpoint. When the user changes the field of view, the shape of indicator 904 may change accordingly.

Referring back to FIG. 4, at block 440, navigation device 300 causes display of a guidance UI. The guidance UI may include an indicator corresponding to the target viewpoint, and the indicator may be displayed in the field of view of the user at the current viewpoint. In some examples, the indicator may include a plurality of arrows indicating the direction of the target viewpoint. The shape of the indicator may indicate a qualitative direction to the target viewpoint. For instance, the shape of the indicator may indicate a left, forward, or right direction towards the target viewpoint. In some variations, the shape of the indicator may indicate a quantitative direction to the target viewpoint. For instance, the shape of the indicator may be an arc (e.g., arc 832) that passes through the current viewpoint and the target viewpoint, so as to indicate a more specific direction towards the target viewpoint.

In some examples, navigation device 300 may adjust, based on a scaling ratio, the shape of the indicator included in the guidance UI. The scaling of the indicator may be associated with an observing height at the current viewpoint. In some examples, the observing height may be associated with the user at the current viewpoint. In some examples, the observing height of a user at a viewpoint may be determined based on a height at which a data acquisition device collects spatial information for generating the simulated environment. For instance, the observing height of a viewpoint may be the height of the data acquisition device with respect to the ground. By adjusting the shape of the indicator included in the guidance UI according to different observing heights at multiple viewpoints, navigation device 300 may provide user with a guidance UI that has an appearance consistent with the shapes of the surrounding scenes and/or objects at different viewpoints in the simulated environment, thus ensuring a seamless user experience while switching views.

Figure 10:
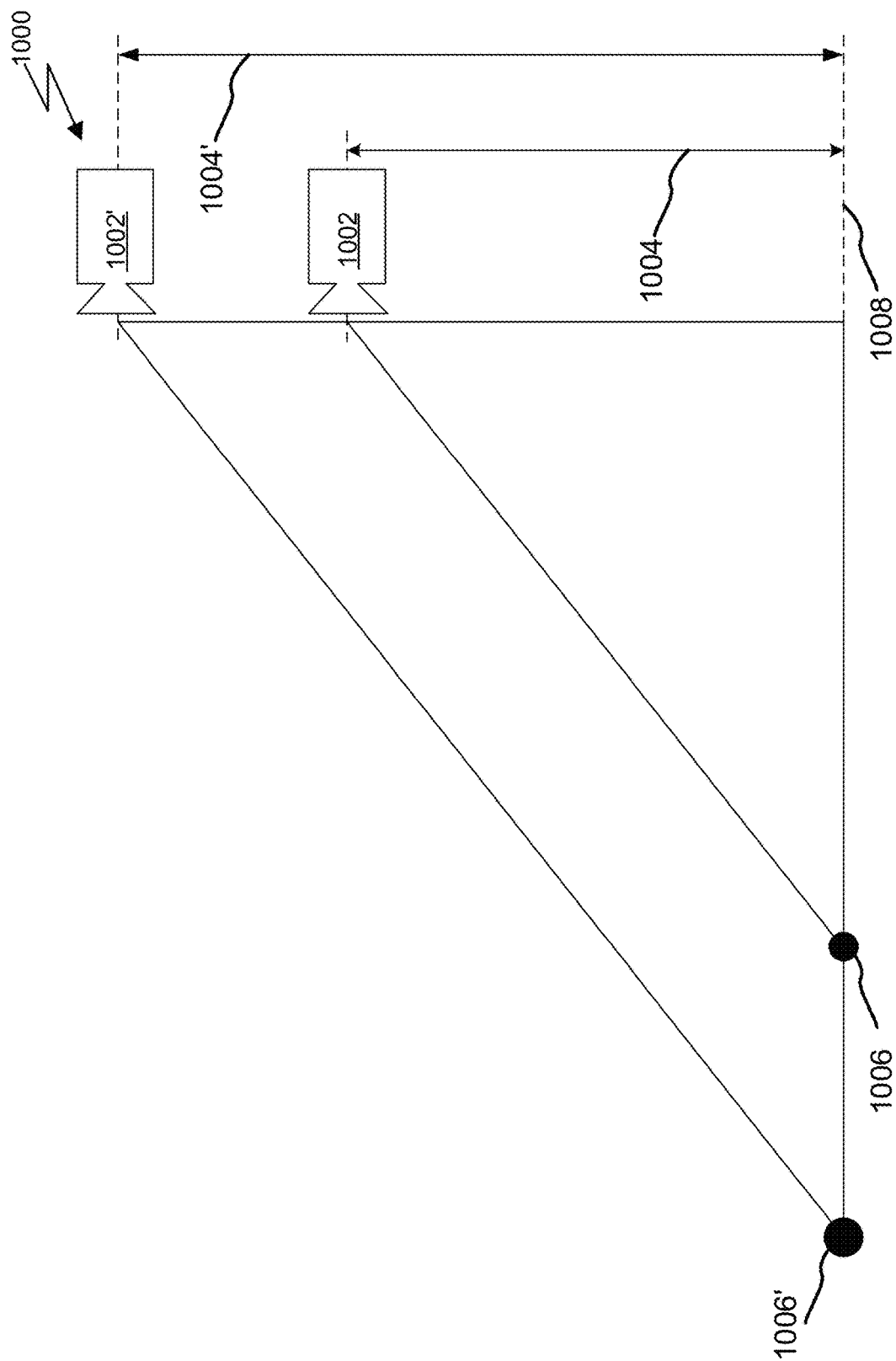
FIG. 10 illustrates detailed steps of scaling an indicator in accordance with one or more embodiments.

FIG. 10 illustrates detailed steps of scaling an indicator in accordance with one or more embodiments.

First, navigation device 300 may determine, for an observer 1002, a standard observing height 1004 and a standard shape 1006 of an indicator corresponding to standard observing height 1004. Observer 1002 may be a user and/or a data acquisition device. In some examples, the standard height and the corresponding standard shape of the indicator may be stored in navigation device 300 in advance. Additionally, and/or alternatively, navigation device 300 may change the setting of the standard height and the corresponding standard shape of the indicator in response to user inputs.

Second, navigation device 300 may determine, for an observer 1002', an observing height 1004' at a current viewpoint based on a set of 3D coordinates associated with the current viewpoint. Observer 1002' may be observer 1002 at the current viewpoint. Each of standard observing height 1004 and observing height 1004' at the current viewpoint may be determined with respect to the ground.

Third, navigation device 300 may determine a scaling ratio based on the observing height at the current viewpoint and a standard observing height. For instance, the scaling ratio may be observing height 1004' at the current viewpoint to standard observing height 1004. Based on the scaling ratio, navigation device 300 may determine an appearance of the guidance UI corresponding to a target viewpoint. For instance, navigation device 300 may change the size of the indicator included in the guidance UI based on the scaling ratio.

Fourth, navigation device 300 may scale a shape of an indicator included in the guidance UI based on the scaling ratio and the standard shape of the indicator. For instance, navigation device 300 may multiply the scaling ratio and standard shape of the indicator 1006 so as to generate the scaled indicator 1006' that is included in the guidance UI at the current viewpoint.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method, comprising:
    determining, for a current viewpoint, a search space associated with a plurality of viewpoints other than the current viewpoint in a three-dimensional (3D) space, wherein the search space comprises a set of 3D coordinates for each of the plurality of viewpoints, wherein the set of 3D coordinates indicates a position of the corresponding viewpoint in the 3D space, wherein the set of 3D coordinates is associated with a 3D coordinate system, and wherein determining the search space comprises projecting the set of 3D coordinates onto a 2D coordinate system to generate a set of 2D coordinates for each of the plurality of viewpoints;
    determining a field of view at the current viewpoint, wherein the field of view is an area associated with a viewing angle and a visible distance;
    determining, based on the field of view at the current viewpoint, a target viewpoint in the search space of the current viewpoint, wherein all of the viewpoints in the search space of the current viewpoint are outside the area of the field of view at the current viewpoint, wherein the target viewpoint is one viewpoint among the viewpoints in the search space of the current viewpoint, and wherein determining the target viewpoint in the search space is based on the set of 2D coordinates associated with the target viewpoint of the plurality of viewpoints; and
    causing display of a guidance user interface (UI) comprising an indicator corresponding to the target viewpoint in the field of view at the current viewpoint,
    wherein determining the search space further comprises:
        determining, a plurality of first distances associated with the set of 2D coordinates for the plurality of viewpoints and a set of 2D coordinates for the current viewpoint; and
        determining a plurality of angles associated with the set of 2D coordinates for the plurality of viewpoints and the set of 2D coordinates for the current viewpoint, and
    wherein determining the target viewpoint in the search space is based on a target distance, of the plurality of first distances, associated with the target viewpoint and a target angle, of the plurality of angles, associated with the target viewpoint.

2. The method according to claim 1, wherein determining the target viewpoint in the search space further comprises:
    determining a single viewpoint, of the plurality of viewpoints in the search space, wherein the single viewpoint is associated with an angle, of the plurality of angles, smaller than the viewing angle at the current viewpoint; and
    determining the single viewpoint as the target viewpoint, and
    wherein causing display of the guidance UI comprises generating the guidance UI based on the target angle associated with the target viewpoint and the viewing angle at the current viewpoint.

3. The method according to claim 1, wherein determining the target viewpoint in the search space further comprises:
    determining at least two viewpoints, of the plurality of viewpoints, in the search space, wherein each of the determined viewpoints is associated with an angle, of the plurality of angles, smaller than the viewing angle at the current viewpoint and a first distance, of the plurality of first distances, greater than the visible distance at the current viewpoint; and
    determining a viewpoint, of the at least two viewpoints, as the target viewpoint based on the viewpoint having a shortest first distance,
    wherein causing display of the guidance UI comprises generating the guidance UI based on the target angle associated with the target viewpoint and the viewing angle at the current viewpoint.

4. The method according to claim 1, wherein the viewing angle at the current viewpoint is partitioned into a number of portions, and wherein the method further comprises:
    determining, based on a target angle associated with the target viewpoint, a portion of the viewing angle that the target viewpoint falls in;
    determining a shape of the indicator corresponding to the portion of the viewing angle that the target viewpoint falls in; and
    generating the guidance UI based on the shape of the indicator.

5. The method of claim 4, wherein the shape of the indicator comprises one or more arrows pointing in a particular direction.

6. The method of claim 1, wherein causing the display of the guidance UI is dynamically updated, in response to the field of view at the current viewpoint changes.

7. A device, comprising:
    one or more processors; and
    a non-transitory computer-readable medium, having computer-executable instructions stored thereon, the computer-executable instructions, when executed by one or more processors, cause the one or more processors to facilitate:
        determining, for a current viewpoint, a search space associated with a plurality of viewpoints other than the current viewpoint in a three-dimensional (3D) space, wherein the search space comprises a set of 3D coordinates for each of the plurality of viewpoints, wherein the set of 3D coordinates indicates a position of the corresponding viewpoint in the 3D space, wherein the set of 3D coordinates is associated with a 3D coordinate system, and wherein determining the search space comprises projecting the set of 3D coordinates onto a 2D coordinate system to generate a set of 2D coordinates for each of the plurality of viewpoints;
        determining a field of view at the current viewpoint, wherein the field of view is an area associated with a viewing angle and a visible distance;
        determining, based on the field of view at the current viewpoint, a target viewpoint in the search space of the current viewpoint, wherein all of the viewpoints in the search space of the current viewpoint are outside the area of the field of view at the current viewpoint, wherein the target viewpoint is one viewpoint among the viewpoints in the search space of the current viewpoint, and wherein determining the target viewpoint in the search space is based on the set of 2D coordinates associated with the target viewpoint of the plurality of viewpoints; and
        causing display of a guidance user interface (UI) comprising an indicator corresponding to the target viewpoint in the field of view at the current viewpoint,
        wherein determining the search space further comprises:
            determining, a plurality of first distances associated with the set of 2D coordinates for the plurality of viewpoints and a set of 2D coordinates for the current viewpoint; and determining a plurality of angles associated with the set of 2D coordinates for the plurality of viewpoints and the set of 2D coordinates for the current viewpoint, and wherein determining the target viewpoint in the search space is based on a target distance, of the plurality of first distances, associated with the target viewpoint and a target angle, of the plurality of angles, associated with the target viewpoint.

8. The device of claim 7, wherein determining the search space further comprises:

determining a single viewpoint, of the plurality of viewpoints in the search space, wherein the single viewpoint is associated with an angle, of the plurality of angles, smaller than the viewing angle at the current viewpoint; and determining the single viewpoint as the target viewpoint, and wherein causing display of the guidance UI comprises generating the guidance UI based on the target angle associated with the target viewpoint and the viewing angle at the current viewpoint.

9. The device of claim 7, determining the search space further comprises:

determining at least two viewpoints, of the plurality of viewpoints, in the search space, wherein each of the determined viewpoints is associated with an angle, of the plurality of angles, smaller than the viewing angle at the current viewpoint and a first distance, of the plurality of first distances, greater than the visible distance at the current viewpoint; and determining a viewpoint, of the at least two viewpoints, as the target viewpoint based on the viewpoint having a shortest first distance, wherein causing display of the guidance UI comprises generating the guidance UI based on the target angle associated with the target viewpoint and the viewing angle at the current viewpoint.

10. The device of claim 7, wherein the viewing angle at the current viewpoint is partitioned into a number of portions, and wherein the computer-executable instructions, when executed by one or more processors, cause the one or more processors to further facilitate:

determining, based on a target angle associated with the target viewpoint, a portion of the viewing angle that the target viewpoint falls in;

determining a shape of the indicator corresponding to the portion of the viewing angle that the target viewpoint falls in; and generating the guidance UI based on the shape of the indicator.

11. A non-transitory computer-readable medium, having computer-executable instructions stored thereon, the computer-executable instructions, when executed by one or more processors, cause the one or more processors to facilitate:

determining, for a current viewpoint, a search space associated with a plurality of viewpoints other than the current viewpoint in a three-dimensional (3D) space, wherein the search space comprises a set of 3D coordinates for each of the plurality of viewpoints, wherein the set of 3D coordinates indicates a position of the corresponding viewpoint in the 3D space;

determining a field of view at the current viewpoint, wherein the field of view is an area associated with a viewing angle and a visible distance, wherein the set of 3D coordinates is associated with a 3D coordinate system, and wherein determining the search space comprises projecting the set of 3D coordinates onto a 2D coordinate system to generate a set of 2D coordinates for each of the plurality of viewpoints;

determining, based on the field of view at the current viewpoint, a target viewpoint in the search space of the current viewpoint, wherein all of the viewpoints in the search space of the current viewpoint are outside the area of the field of view at the current viewpoint, wherein the target viewpoint is one viewpoint among the viewpoints in the search space of the current viewpoint, and wherein determining the target viewpoint in the search space is based on the set of 2D coordinates associated with the target viewpoint of the plurality of viewpoints; and causing display of a guidance user interface (UI) comprising an indicator corresponding to the target viewpoint in the field of view at the current viewpoint, wherein determining the search space further comprises:

determining, a plurality of first distances associated with the set of 2D coordinates for the plurality of viewpoints and a set of 2D coordinates for the current viewpoint; and determining a plurality of angles associated with the set of 2D coordinates for the plurality of viewpoints and the set of 2D coordinates for the current viewpoint, and wherein determining the target viewpoint in the search space is based on a target distance, of the plurality of first distances, associated with the target viewpoint and a target angle, of the plurality of angles, associated with the target viewpoint.

12. A method, comprising:

determining, for a current viewpoint, a search space associated with a plurality of viewpoints other than the current viewpoint in a three-dimensional (3D) space, wherein the search space comprises a set of 3D coordinates for each of the plurality of viewpoints, wherein the set of 3D coordinates indicates a position of the corresponding viewpoint in the 3D space, wherein the set of 3D coordinates is associated with a 3D coordinate system, and wherein determining the search space comprises projecting the set of 3D coordinates onto a 2D coordinate system to generate a set of 2D coordinates for each of the plurality of viewpoints;

determining a field of view at the current viewpoint, wherein the field of view is an area associated with a viewing angle and a visible distance;

determining, based on the field of view at the current viewpoint, a target viewpoint in the search space of the current viewpoint, wherein all of the viewpoints in the search space of the current viewpoint are outside the area of the field of view at the current viewpoint, wherein the target viewpoint is one viewpoint among the viewpoints in the search space of the current viewpoint, and wherein determining the target viewpoint in the search space is based on the set of 2D coordinates associated with the target viewpoint of the plurality of viewpoints; and causing display of a guidance user interface (UI) comprising an indicator corresponding to the target viewpoint in the field of view at the current viewpoint, wherein determining the search space further comprises:

determining a plurality of second distances associated with the set of 2D coordinates for the plurality of viewpoints and a center line of the field of view at the current viewpoint; and determining a plurality of angles associated with the set of 2D coordinates for the plurality of viewpoints and the set of 2D coordinates for the current viewpoint, and wherein determining the target viewpoint in the search space is based on a target distance, of the plurality of second distances, associated with the target viewpoint and a target angle, of the plurality of angles, associated with the target viewpoint.

13. The method according to claim 12, wherein the target viewpoint has the shortest second distance of the plurality of second distances in the search space.

14. The method according to claim 12, further comprising:

determining a mid-point between the target viewpoint and the current viewpoint and a line between the viewpoint and the current viewpoint;

determining a perpendicular line associated with the mid-point and the line between the target viewpoint and the current viewpoint;

determining a shape of the indicator based on an arc defined by an intersection between the perpendicular line and a coordinate axis associated with the current viewpoint; and generating the guidance UI based on the shape of the indicator.

15. The method according to claim 12, wherein determining the target viewpoint in the search space further comprises:

determining a single viewpoint, of the plurality of viewpoints in the search space, wherein the single viewpoint is associated with an angle, of the plurality of angles, smaller than the viewing angle at the current viewpoint; and determining the single viewpoint as the target viewpoint, and wherein causing display of the guidance UI comprises generating the guidance UI based on the target angle associated with the target viewpoint and the viewing angle at the current viewpoint.

16. The method according to claim 12, wherein determining the target viewpoint in the search space further comprises:

determining at least two viewpoints, of the plurality of viewpoints, in the search space, wherein each of the determined viewpoints is associated with an angle, of the plurality of angles, smaller than the viewing angle at the current viewpoint and a second distance, of the plurality of second distances, greater than the visible distance at the current viewpoint; and determining a viewpoint, of the at least two viewpoints, as the target viewpoint based on the viewpoint having a shortest first distance, wherein causing display of the guidance UI comprises generating the guidance UI based on the target angle associated with the target viewpoint and the viewing angle at the current viewpoint.

17. The method according to claim 12, wherein the viewing angle at the current viewpoint is partitioned into a number of portions, and wherein the method further comprises:

determining, based on a target angle associated with the target viewpoint, a portion of the viewing angle that the target viewpoint falls in;

determining a shape of the indicator corresponding to the portion of the viewing angle that the target viewpoint falls in; and generating the guidance UI based on the shape of the indicator.

\* \* \* \* \*